(12) United States Patent
Mankes

(10) Patent No.: US 6,477,503 B1
(45) Date of Patent: Nov. 5, 2002

(54) ACTIVE RESERVATION SYSTEM

(76) Inventor: Robert O. Mankes, 4602 Mill Village Rd., Raleigh, NC (US) 27612

(*) Notice: Subject to any disclaimer, the term of this patent is extended or adjusted under 35 U.S.C. 154(b) by 0 days.

(21) Appl. No.: 09/467,501

(22) Filed: Dec. 20, 1999

Related U.S. Application Data

(60) Provisional application No. 60/142,784, filed on Jul. 8, 1999.

(51) Int. Cl.[7] .............................................. G06F 17/60
(52) U.S. Cl. ......................................................... 705/5
(58) Field of Search .................... 705/5, 6; 340/825.28, 340/825.29

(56) References Cited

U.S. PATENT DOCUMENTS

| | | | |
|---|---|---|---|
| 5,581,461 A | * | 12/1996 | Coll et al. ....................... 705/5 |
| 5,832,452 A | * | 11/1998 | Schneider et al. ............. 705/58 |
| 5,842,176 A | * | 11/1998 | Hunt et al. ...................... 705/5 |
| 5,864,818 A | * | 1/1999 | Feldman ......................... 705/5 |

OTHER PUBLICATIONS

"Article entitled: Lanyon: Industry leading RFP assist eclipsed by new Lanyon solution, RFP Publisher; Web–enabled property vault compliant RFP publisher defines next generation in hotel RFP processing", published by M2 Communications, Dec. 18, 2000.*

* cited by examiner

Primary Examiner—Sam Rimell
(74) Attorney, Agent, or Firm—Mills Law Firm PLLC

(57) ABSTRACT

An active reservation system that allows an event vendor to maintain a stand-alone inventory control system which ties directly to an active reservation server, which in turn is distributed through Internet-based reservation systems (web sites) to the users of the Internet. The reservation system includes a local event server that provides the means of maintaining the inventory and the communications with the active reservation server. The local event server allows the event vendor to allocate, control and reserve their inventory at their place of business. This server can then communicate over a network to an active reservation server, which maintains data that Internet-based reservation systems use to provide access to the inventory. The event vendor maintains total control over their inventory while allowing access to that inventory by a much larger audience.

4 Claims, 9 Drawing Sheets

ACTIVE RESERVATION SYSTEM

RELATED APPLICATIONS

This applications claims the benefit under 35 USC 120 of U.S. Provisional Application No. 60/142,784 filed on Jul. 8, 1999.

FIELD OF INVENTION

This invention relates to reservation systems for goods and services, and, in particular, to a system for reserving available inventory under the control of the inventory holder, while providing access to their inventory through Internet communication networks.

BACKGROUND OF THE INVENTION

Various inventory control and reservation systems are employed for goods and services. The present invention will be described with primary reference to the reservation of accommodations, such as hotel and motel rooms. However, it will be readily apparent that the present reservation systems may be used in a wide variety of applications wherein an inventory is made available for local, on-site transactions and remotely made available through telecommunications networking and the Internet in particular. Accordingly, the system may be used for entertainment and sporting activities, vehicle rentals, tour packages and like activities wherein the inventory demand arises on site or off-site, contemporaneously or subsequently.

The accommodations sector, particularly motels and hotels, has changed in recent time. Whereas previously local, independently operated establishments were predominant and made reservations at point of sale, chains and franchises operating nationally under a common name have become predominant. In order to serve more fully the national market, such businesses have employed a central reservation system accessed through toll free numbers. Typically, a central reservation system has been used in conjunction with a local system at the site of the inventory to sell available inventory. Therein, the local system assesses the local market, retains a portion of the inventory for local sale, and transfer the remaining inventory to the central reservation systems for distribution. This creates an open looped system wherein the two blocks of inventory are processed independently, each under the control of an autonomous administrator and neither having contemporaneous information on the overall state of the local inventory. While the central system status may be queried by the local site, reallocation of the central inventory is difficult and requires manual intervention through conventional communication sources, typically person-to-person phone conversations. In such systems, the central system will book reservations only until depletion, thereafter declining reservations even though inventory remains available at the local site. Further, the local site cannot accept reservations in excess of the local allotment even though the central system has uncommitted inventory. As a result, the local system may operate at under capacity.

In such a setting and operation, the typical central reservation system is a closed system. Only authorized personnel can query the data and procure the inventory. The communication between the event vendor and the central reservation system is usually done via a dedicated data line on a permanently connected or intermittently connected basis. This effectively limits the accessibility of the data to only those authorized few and, in the case of intermittent systems, not in real time.

Various approaches have been under taken to overcome the above limitations while affording some of the features achieved with the present invention.

For example, U.S. Pat. No. 5,319,548 to Germain discloses an interactive system that collects and analyzes golf information that is recorded on individual golf play recording cards. The recording cards also store course information such as weather conditions, etc., for the use of individual players. This system also can be set up to be a central database for storing tee-time reservations for courses worldwide.

U.S. Pat. No. 5,422,809 to Griffin et al. discloses a system providing travel destination information and making travel destinations. The system includes an information storage and retrieval system for storing, referencing, and retrieving various travel destinations from a database. This type system includes individual kiosk screens. However, the individual screens are connected to a central database that stores the information and the system can then access individual travel destinations to make reservations. The system is controlled by the central database to the exclusion of the local site.

U.S. Pat. No. 5,581,461 to Coll et al. discloses a central reservation system that manages data shared among a central database and a number of remote databases. This system is an example of the aforementioned central reservation system, with a central database that store various reservation information and is linked to several travel destinations, rather than the central database being located in the travel destination itself U.S. Pat. No. 5,732,398 to Tagawa discloses a self-service system for selling travel-related services or products. However, this system uses a database that searches all available products, essentially taking the place of a travel agent, and is not linked directly between the local inventory site and the end user.

U.S. Pat. No. 5,797,126 to Helbling et al. discloses an automated system of viewing and dispensing theater tickets. This system acts like a central reservation system communicating directly with the consumer. All of the consumer's actions must be processed through the central station before processing with the theater.

U.S. Pat. No. 5,864,818 to Feldman discloses a system of an automated hotel reservation processing method and system. This system acts as a central reservation system in that the hotel receives reservations from a separate terminal that is accessed by travel agents or other authorized users.

Finally, U.S. Pat. No. 5,901,287 to Bull discloses a system of aggregating and synthesizing data gathered from disparate sources such as those available on a network of the Internet type. This system is more of a user profile synthesizing system that tracks a user's on-line activities for individually tailored network use, rather than a system of collecting reservation data at specific establishments.

SUMMARY OF THE INVENTION

In view of the foregoing limitations, the present invention has been developed to provide a system in which the event vendor's entire inventory resides at and is controlled at the local point of sale site. Rather than the vendor giving up control and sending its inventory to a central reservation system for eventual sale, the vendor itself maintains control of its inventory at its own location and allows access to the data to whomever it decides, rather than only authorized users of a central reservation system. Once the inventory is sold through one of many networked affiliations, a local transaction removes the item from available inventory both on-site and off-site. Thus, the present invention has been developed to allow event vendors to maintain their current reservation practices and control their inventory while providing access to their inventory by anyone with Internet access.

Herein, the event vendor uses a local event owner server to allocate, control and reserve their inventory at their place of business. The local server communicates over an Internet network to an active, remotely located reservation server. The reservation server maintains data on an Internet-based reservation systems and provides networked access to consumers therethrough to provide access to the inventory. Thus, the event vendor maintains total control over the local inventory while allowing access to that inventory by a much larger audience, namely anyone using Internet-based reservation systems that are available on the Internet. Upon confirming purchase of an inventory item, the local event server removes the item from the local server and accesses the reservation server to make a corresponding deduction.

The present invention thus provides method for operating a system for locally and remotely reserving the purchase of goods and services using a local event server located at a local site and a reservation server with replicated data at a remote site using Internet connections. The local event server maintains an inventory of available goods and services and designates a rate structure for each of said goods and services. The local server allocates a portion of the inventory as reservation server inventory and transfer such data to the reservation server. The reservation server through web sites of their desired format makes the allocated inventory available to consumers through secondary Internet connections. The reservation server receives from consumers prospective reservations for discrete items and relevant consumer information. The reservation server communicates the prospective reservations to the local server. The local server accepts the prospective reservations and removes the items from the reservation inventory and establishes an adjusted reservation server inventory. The local server creates a confirmation and communicates the adjusted reservation server inventory and said confirmation to the reservation server; which communicates the confirmation to the consumer on an Internet connection.

In view of the above, it is an object of the present invention to provide a reservations system that allows an event vendor's inventory to reside and be controlled at the point of sale through a local event server.

Another object of the present invention is to allow access of an event vendor's inventory to anyone using Internet-based reservation systems (web sites) through an active reservation server, while the event vendor maintains control of its inventory at the point of sale.

A further object of the present invention is to provide a local event server that has the capability to continue to operate should the connection to the active reservation server be lost, where the event vendor can continue point of sale reservation practices.

BRIEF DESCRIPTION OF THE DRAWINGS

The above and other objects and advantages of the present invention will become apparent upon reading the following detailed description taken in conjunction with the accompanying drawings in which:

FIG. 10 is a flow diagram of the event owner server processing of reservation requests.

DETAILED DESCRIPTION OF THE PREFERRED EMBODIMENTS

The present invention will be described by reference to the reservation of accommodations. However, it will be readily apparent that the present reservation systems may be used in a wide variety of applications wherein an inventory is made available for local, on-site transactions and remotely made available through telecommunications networking and the Internet in particular. Accordingly, the system may be used for entertainment and sporting activities, vehicle rentals, tour packages and like activities wherein the inventory demand arises on site or off-site, contemporaneously or subsequently.

Figure 1:
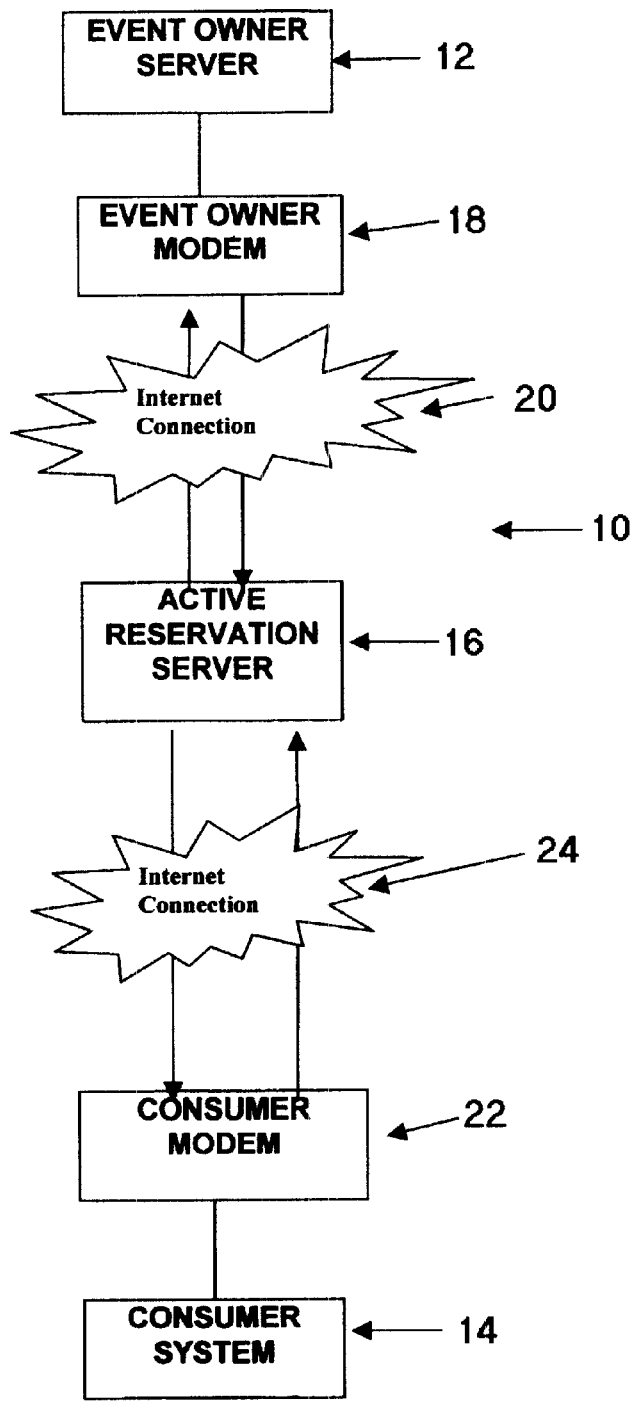
FIG. 1 is a schematic of the active reservation system in accordance with a preferred embodiment of the present invention.

Referring to the drawings for the purpose of illustrating the preferred embodiments of the present invention and not for limiting same, FIG. 1 illustrates an active reservation system 10 for interfacing an event owner server (EOS) 12, under the control of a local event owner, and a consumer system 14, under the control of a consumer and prospective purchaser of the goods and services of the event owner, with an active reservation system (ARS) 16 located at a remote site and under the control of a third party administrator for facilitating transactions between the consumer and the event owner. The EOS 12 communicates with the ARS 16 through event owner modem 18 and Internet connection 20. The consumer system 14 communicates with the ARS 16 through consumer modem 22 and Internet connection 24.

The EOS 12 is located at a vendor's place of business and provides the means to maintain the local inventory of goods and services and communicate with the ARS 16. The local event server owns and controls the inventory of goods and services made available for sale through the ARS 16. The EOS 12 can function as a stand-alone system if the connection to the ARS 16 is for whatever reason lost. As will become apparent, the local inventory may comprise a variety of goods and services available for sale at the local site. Such goods and services may comprise without limitation accommodations, rentals, sports and entertainment activities, and the like goods and service which are made available at the local site for purchase by consumers.

Figure 3:
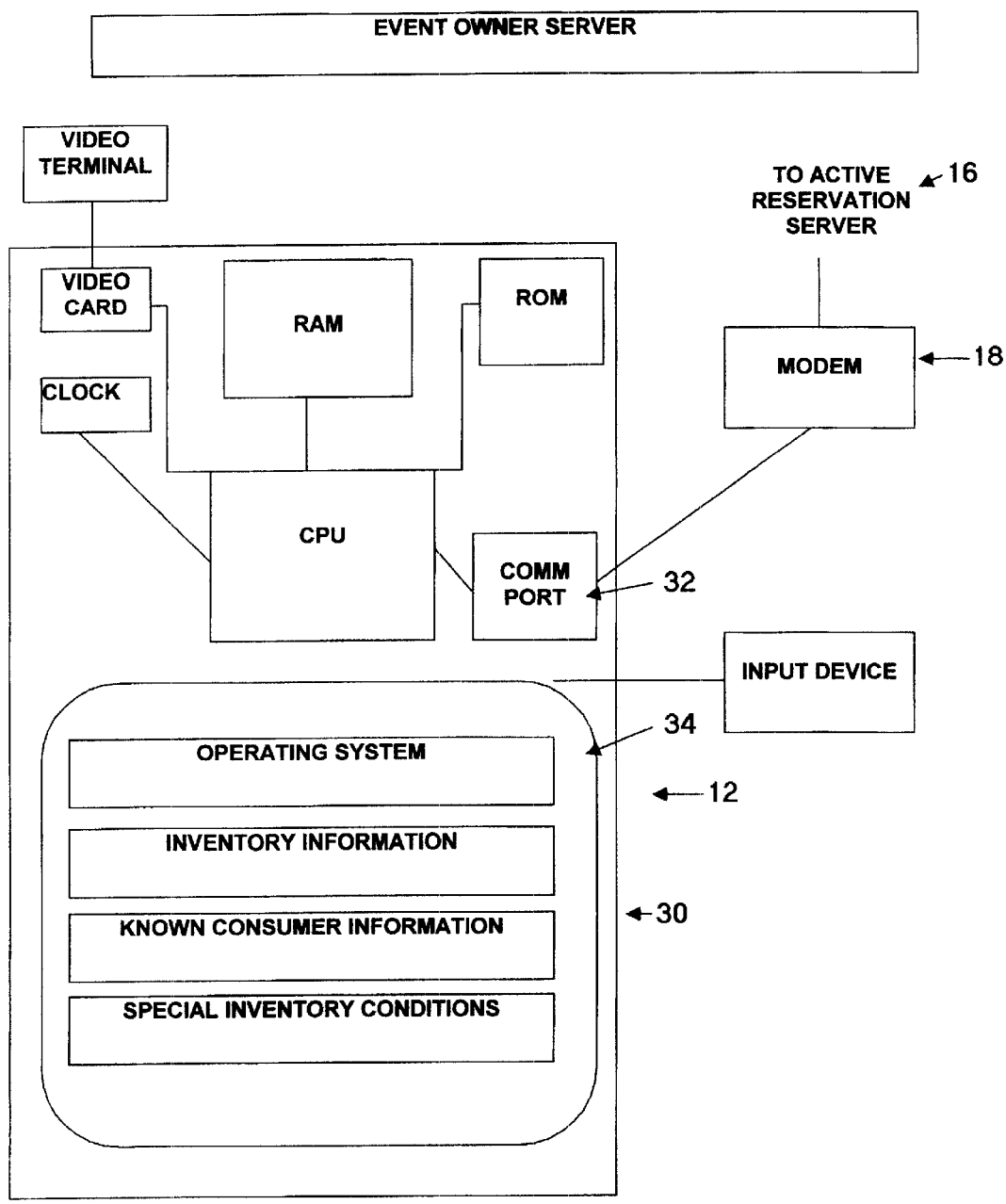
FIG. 3 is a schematic diagram of the local server and Internet connection with the active reservation server.

Referring to FIG. 3, the EOS 12 comprises a computer system 30 communicating with the modem 18 through communication port 32. The system 30 includes a data storage device 34 maintaining for the purposes of the invention the operating system, inventory information, known consumer information and special inventory conditions. The EOS 12 may comprise typically commercially available computer and software adjuncts used in conjunction with reserving and maintaining an inventory for such goods and services, and accessing Internet services. Preferably, the EOS will be a standard x86 Pentium-class based system with ample CPU, speed memory and hard drive storage to serve the needs of its operation with emphasis on speed and maximum availability.

Figure 4:
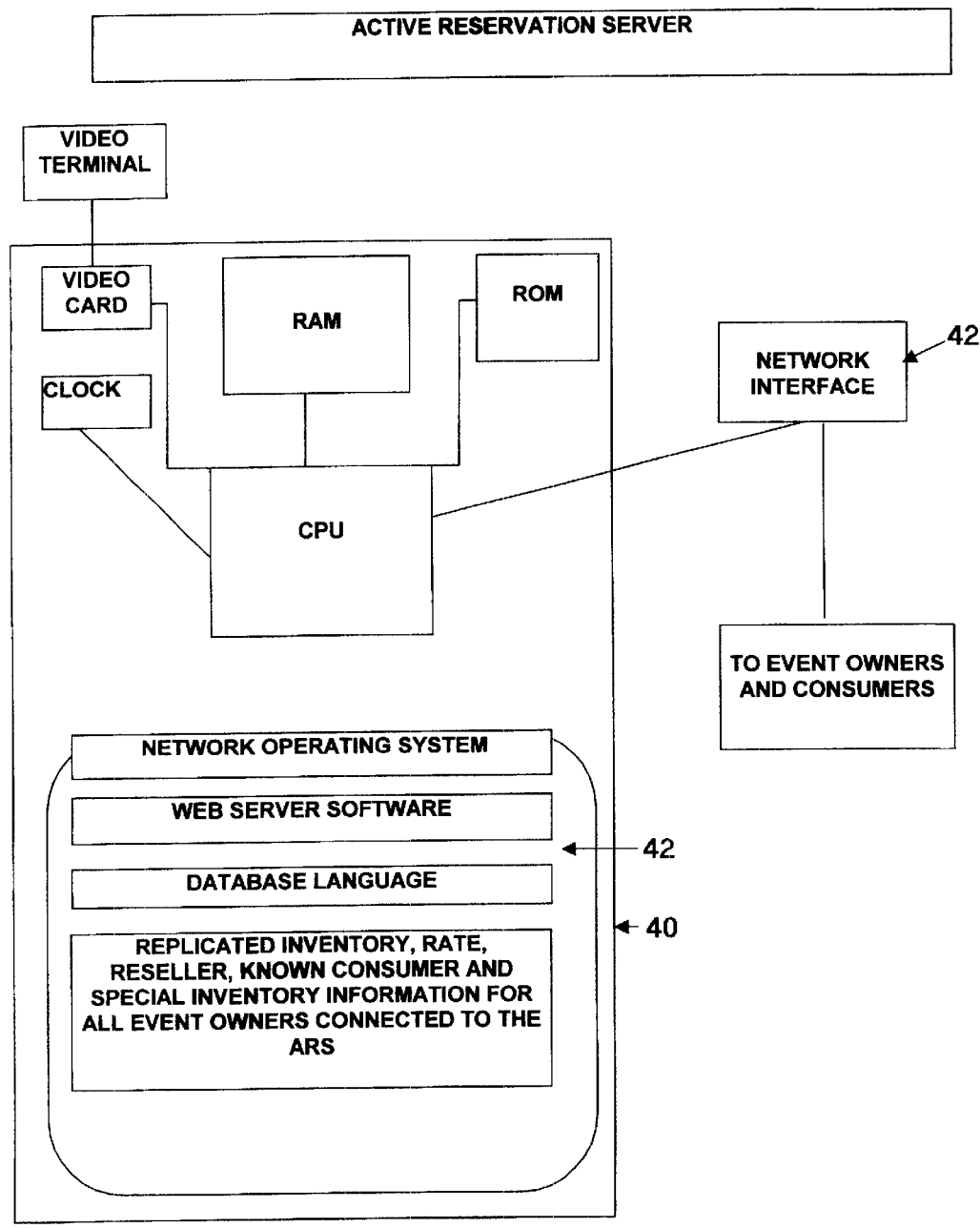
FIG. 4 is a schematic diagram of the active reservation server and the network interface with the event owner server and the consumers.

Referring to FIG. 4, the ARS 16 comprises a computer system 40 communicating with the EOS through an Internet connection and with consumers through network interface 42. The system 40 includes a data storage device 42 maintaining for the purposes of the invention a network operating system, web server software and data base language including but not limited to Internet information server (IIS) and structured query language (SQL) as well as information related to the goods and services including replicated inventory from the EOS, rate, reseller, known consumers, and special inventory information. The ARS 16 may comprise typically a commercially available computer and software adjuncts for the foregoing functions.. Preferably, the EOS will be a standard x86 Pentium-class based system with ample CPU, speed memory and hard drive storage to serve plural event owners with emphasis on speed and maximum availability.

Consumers in the present system may generally comprise various types: an ordinary consumer purchasing initially or infrequently and subject to the posted rates and conditions, and known consumers frequently purchasing goods and services and with whom special rates, commissions and conditions may apply. For example, known consumers may comprises travel agencies, hotel chains, tour brokers and the like.

Figure 5:
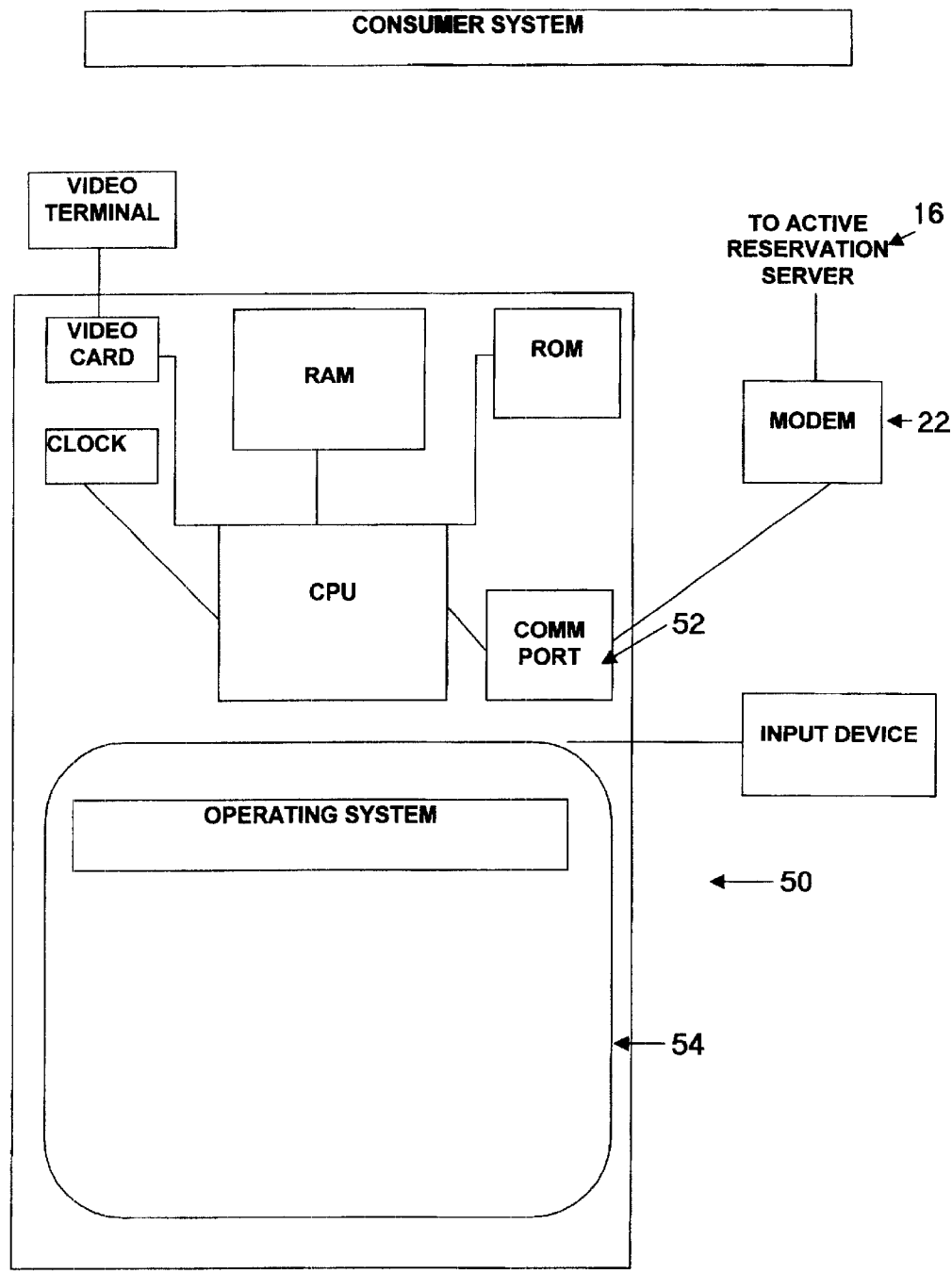
FIG. 5 is a schematic diagram illustrating the consumer system and the Internet connection with the active reservation system.

Referring to FIG. 5, the consumer system 14 comprises a computer system 50 communicating with the modem 22 through communication port 52. The system 50 includes a data storage device 54 maintaining an appropriate operating system. The consumer system 50 may comprise typically commercially available system that can achieve an Internet connection and download and receive web pages.

Figure 6:
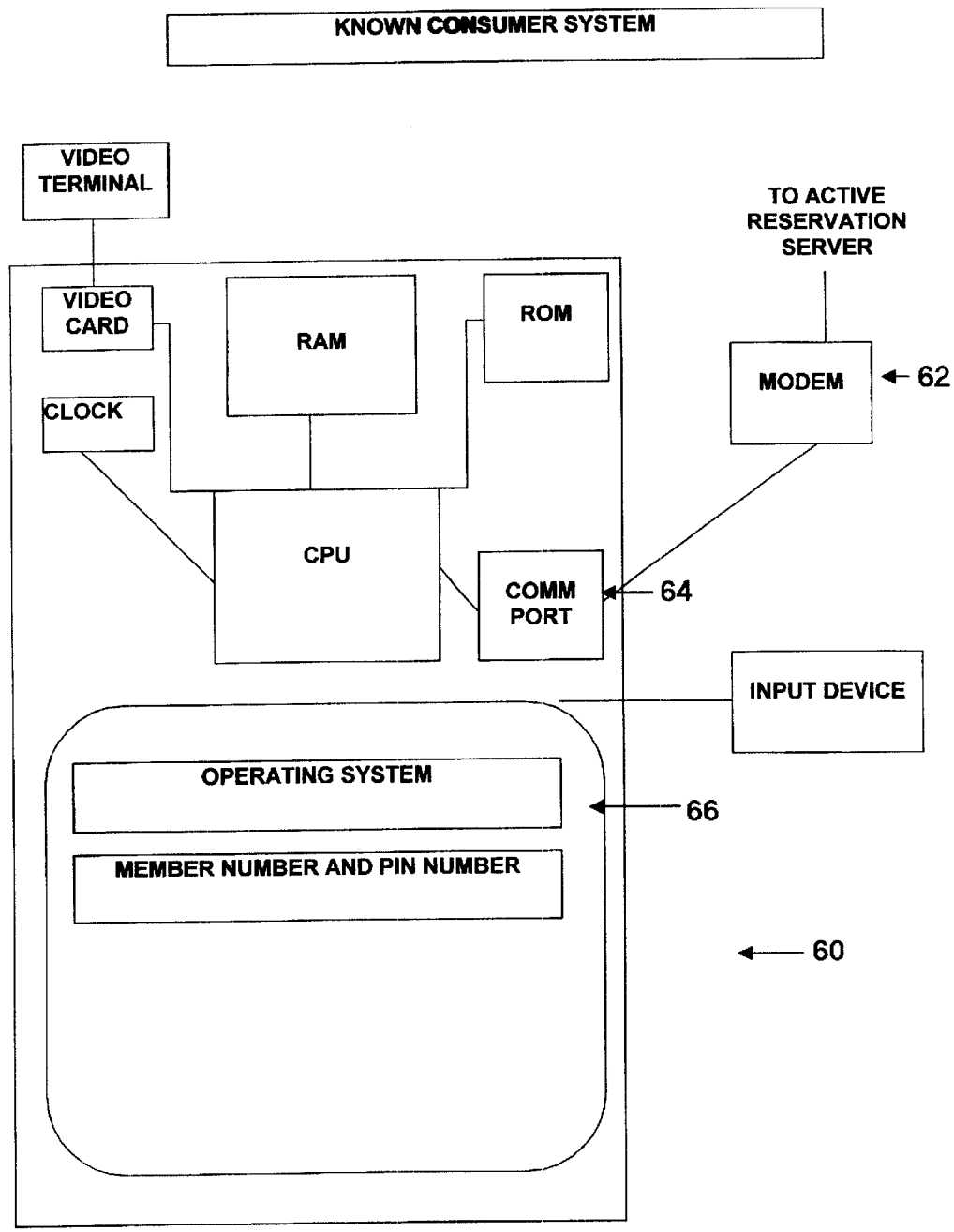
FIG. 6 is a schematic diagram of a consumer interface with the active reservation server.

Referring to FIG. 6, the known consumer system 60 also communicates with a modem 62 through communication port 64. The system 60 includes a data storage device 66 maintaining an appropriate operating system and data relative to the consumer including a member number associated with the event owner and PIN, as well as other information facilitating off-line transactions therebetween. The known consumer system 60 may comprise typically commercially available system that can achieve an Internet connection and download and receive web pages.

As described below, a further class of consumers include resellers who have on line access to rates and conditions differing from the consumer data and generally based on prior arrangements, but for whom the entire transaction may be handled on-line. Access to such separate data can be secured through password control.

Figure 7:
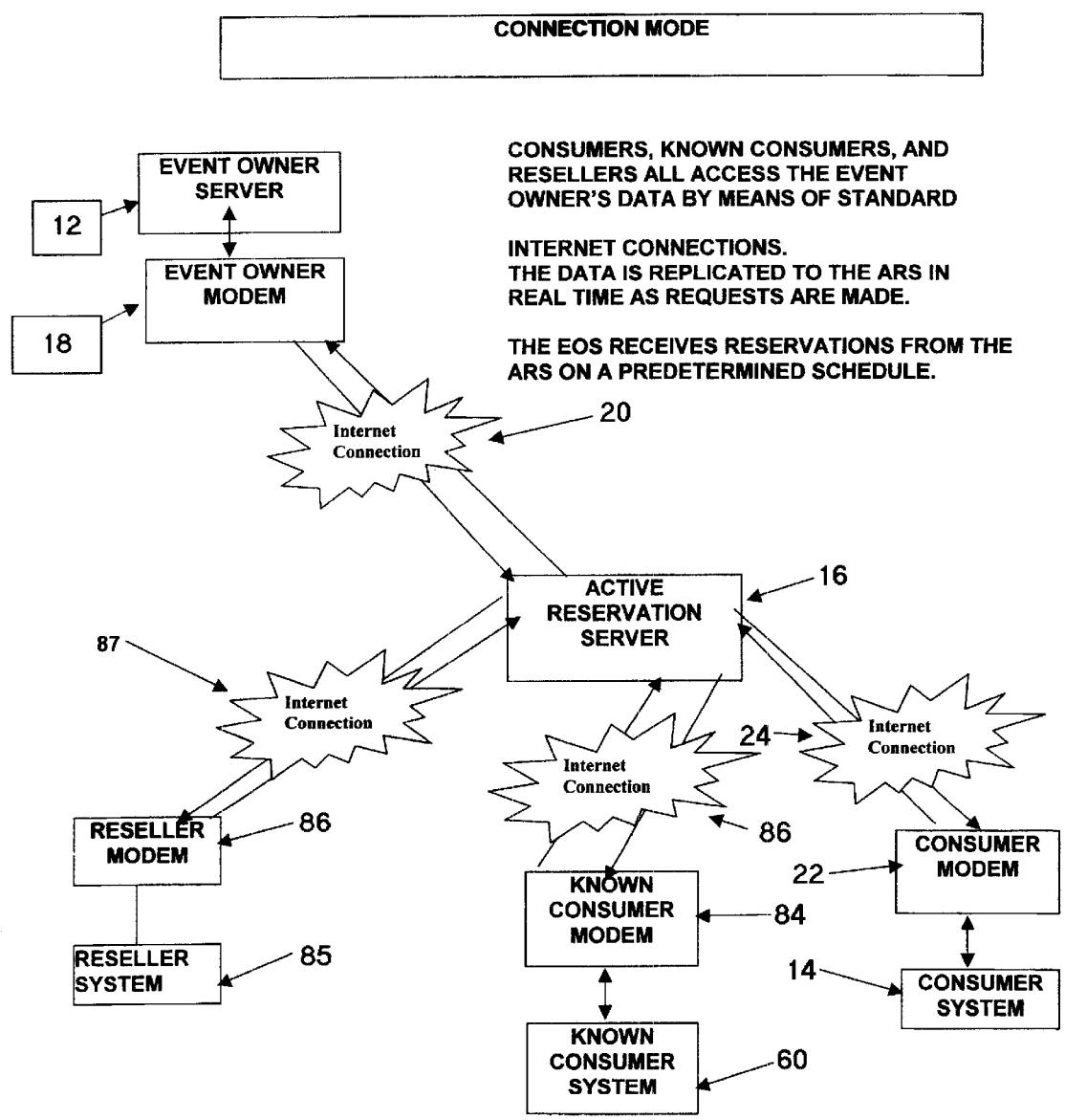
FIG. 7 is a schematic diagram of a known consumer interface with the active reservation server.

Referring to FIG. 7, there is illustrated a comprehensive model for the reservation system incorporating the foregoing modules. Using like designations for the modules, therein The EOS 12 communicates with the ARS 16 through modem 18 and Internet connection 20. The consumer system 22 communicates with the ARS 16 through modem 22 and Internet connection 24. The known consumer system 60 communicates with the ARS 16 through known consumer modem 62 and Internet connection 24. The reseller system 85 communicates with the ARS 16 through modem 86 and Internet connection 87. In the model, all consumers, known consumers and resellers access the event owners data at the ASR 16 through standard Internet connections.

The present invention allows a local event owner to supplement on-site sales with remote orders while retaining control and ownership of the inventory. The following example will reference to an accommodations business wherein rooms are reserved both on-site and through remote, off-site Internet/web site arrangements, keeping in mind that the same or similar operations may be provided for the other above mentioned goods and services.

Therein, a local hotel will have available on a daily basis a number of rooms of varying description, i.e. layout, accessibility, smoking preference, bed descriptions and the like, hereinafter referred to as available local inventory. Using conventional inventory systems, the local vendor can query the system to determine the availability of inventory by such criteria including number of units, rates, dates or other tracked criteria. Experience with local conditions will allow the local vendor to assess the units needed to satisfy on-site demands or local allocation. The remaining inventory, off-site allocation, would then be available for sale through third parties and is hereinafter referred to as off-site inventory, the specifics of which may change during the course of time. As will become apparent, no local allocation need necessarily be maintained. However, to avoid single or multiple large bookings that could exhaust the entire inventory to the exclusion of on-site needs, it is anticipated that the local owner would establish a local allocation, keeping in mind that the present system accommodates ongoing revision thereof in response to local and remote conditions.

The ASR 16 houses a combination of data. Part of this data is replicated from the EOS 12 to allow an accurate representation of the current inventory available from the local event owner. The ASR never changes this replicated data, it only reads it. The EOS 12 periodically updates the replicated data on the ARS 16 guaranteeing that the local event server 10 maintains control over the inventory. The remainder of the data on the active reservation server is not replicated from any other source. The ASR may display and format the data according to their preferences and concurrently represent other vendors of goods and services, similar or differing.

The ASR maintains a replica of certain data elements that reside on the event owner server 12. These elements represent the information the active reservation server needs to provide an accurate representation of the event owner's inventory available to Internet-based reservation systems 12. The active reservation server also houses data that is only needed by the Internet-based reservation systems, but is supplied by the local event server 10. This data is not needed by the local event server 10 for stand-alone operation. The Internet-based reservation systems uses this data to determine how to display available inventory. This data also contains other information, such as address and phone numbers. By storing this data on the active reservation server only, the system remains flexible to changing inventory control needs of the local event owner server administrator.

The local event server 10 provides the means to maintain the inventory and the communications with the active reservation server 11 Control is guaranteed by storing the inventory data locally and replicating it to the active reservation server 16 and by maintaining a one-way connection between the local event server 12 and the active reservation server 16.

In this hierarchy, the local event server 12 is considered the owner of the inventory. This allows total control over the inventory, which in turn allows total flexibility in selling the inventory. The data representing the inventory is stored on the local event server 12, and only parts that are needed by the Internet-based reservation systems are replicated to the active reservation server 16. The local event server 12 handles the actual replication of the data and this guarantees that the local event server 12 controls the inventory that is seen by Internet-based reservation systems.

The local event server's primary responsibility is as a stand-alone inventory management system. Its secondary responsibility is to replicate data to the active reservation server 16 and process reservation requests on the active reservation server 16. Should the connection to the active reservation server be lost, the local event server 12 has the capability to continue to operate as a stand-alone inventory management system. This allows the owners of the inventory to continue to sell based on their own business practices. Only Internet-based reservations 12 are affected, and they are restored once the connection is reestablished.

Figure 8:
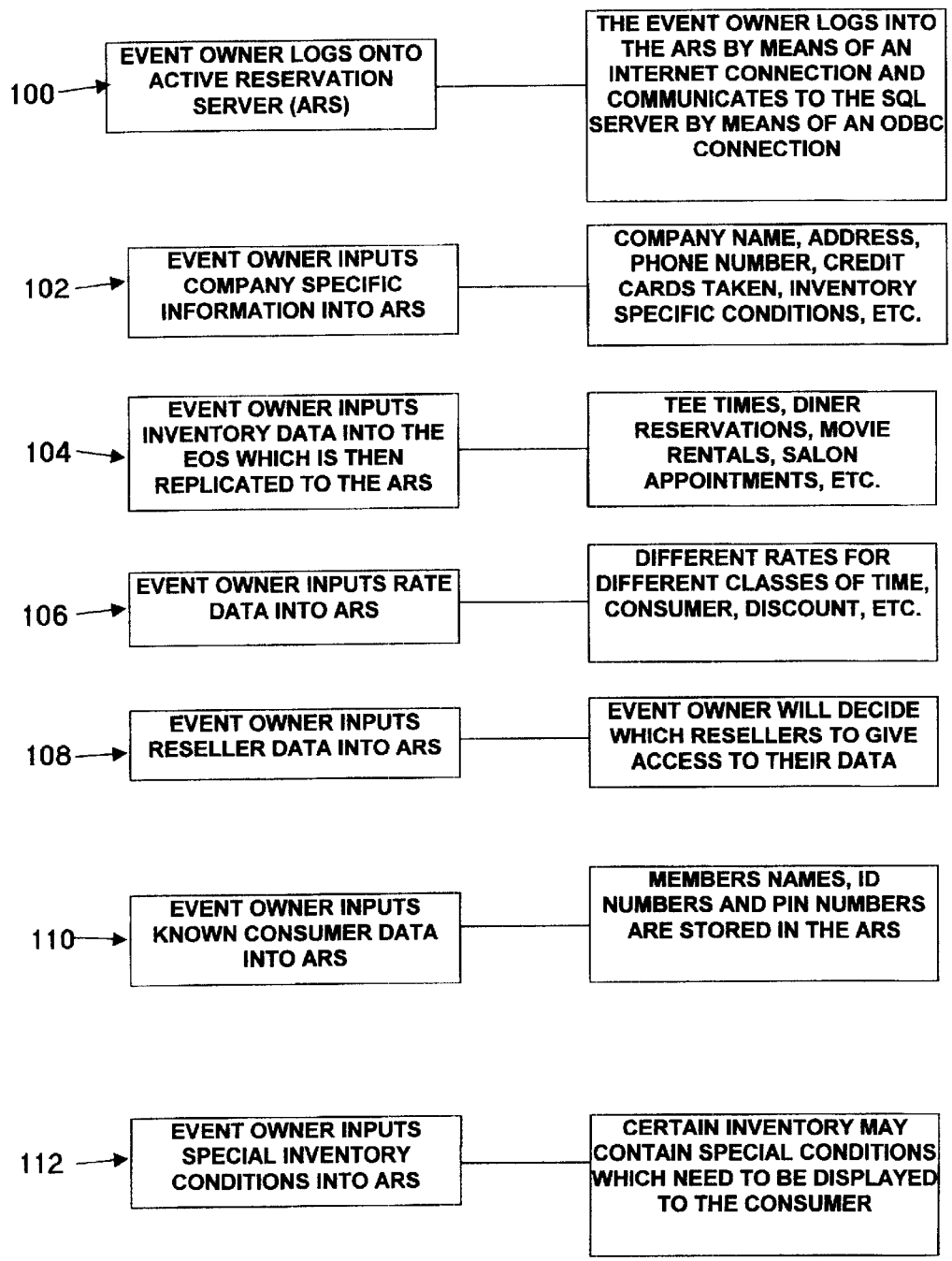
FIG. 8 is a schematic diagram of a reseller interface with the active reservation server.

Referring to FIG. 8, the EOS constructs the interface with the ASR by logging on at block 100 through the Internet connection. Thereat, the EOS communicates with the SQL server through a conventional ODBC connection. Thereafter, the EOS inputs company specific information at block 102. Such information may include company name, address, telephone number, credits cards accepted, inventory specific conditions and the like. Next, the event owner at block 104 inputs into the EOS inventory data that is replicated to the ARS. For the present hotel example, such information may include classification as to room type, layout, bed availability, smoking preferences, location, and other information establishing discrete classes within the inventory spectrum. Thereafter, the event owner at block 106 inputs rate data corresponding to such classifications. In a parallel module data specific to reseller terms is entered at block 108. Access may be secured and limited in accordance with conventional practices. At block 110, the event owner inputs data relative to the known consumer class. Such data may include names, identification and PIN. Further, at block 112, the event owner inputs special inventory conditions. Such information is for direct display to the consumer and may include cancellation, check out, minimum stay and other aspects of the reservation tied to the inventory in general or a particular item.

Figure 2:
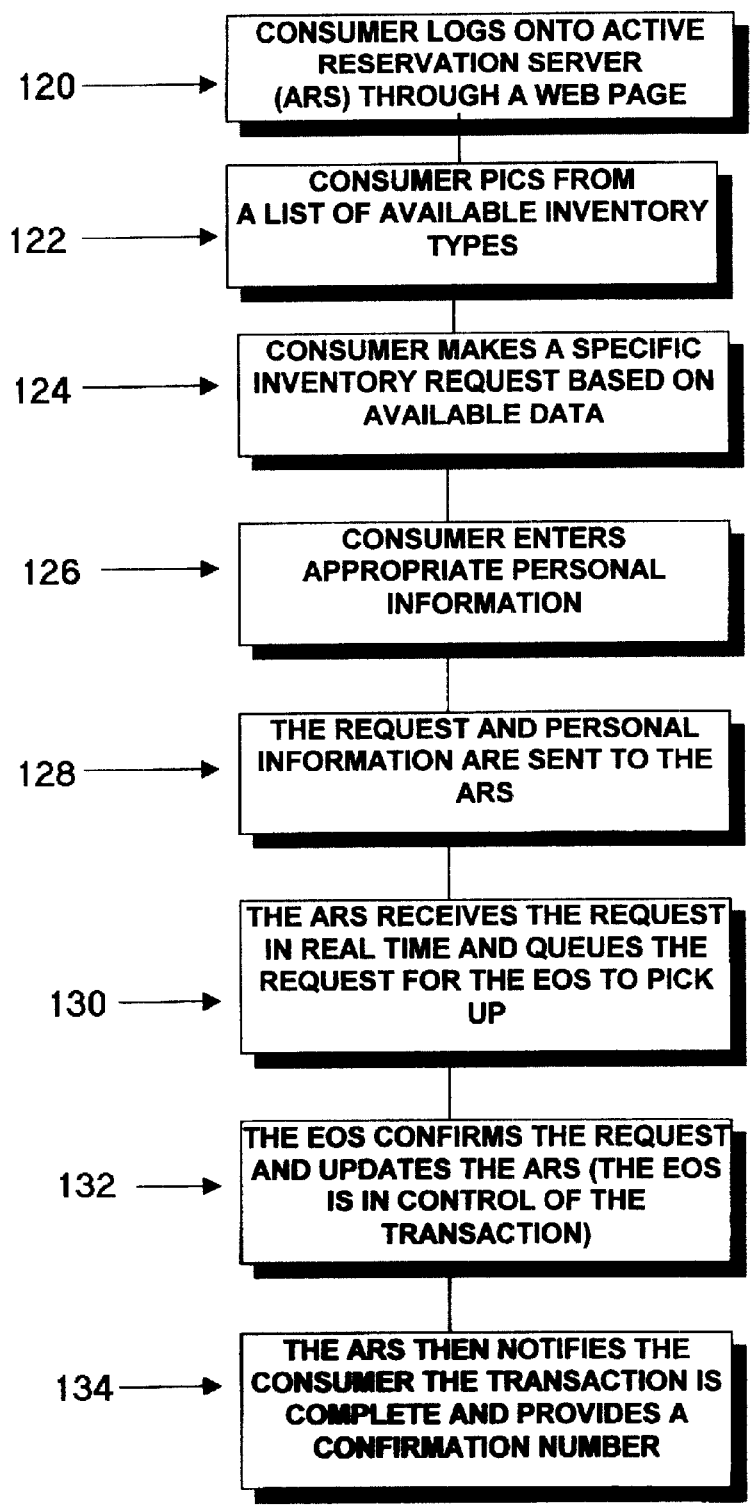
FIG. 2 is a flow diagram illustrating the consumer interface with the the active reservation server.
Figure 9:
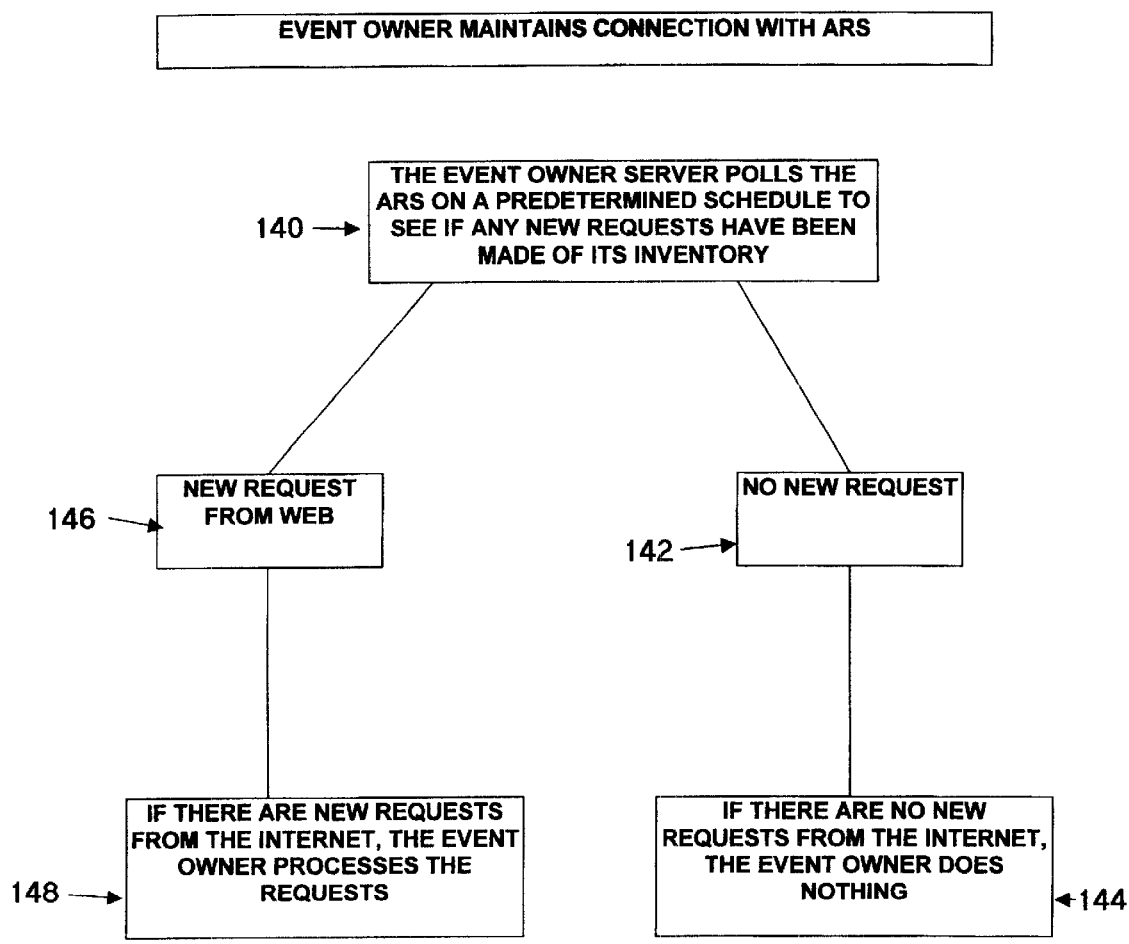
FIG. 9 is a flow diagram of the local event owner inventory control on the reservation system.

Referring to FIG. 2, a consumer, known consumer or reseller logs on to the ASR through a web page at block 120. Such a site might represent a plurality of goods and services, one of which is the event owner remote inventory. The consumer selects the event owner category at block 122. Based on the displayed available inventory according to the consumer's criteria, the consumer makes a specific inventory request at block 124. At block 126, the consumer enters appropriate and prompted information. The requested inventory and information is sent to the ASR at block 128. The ASR at block 130 receives the request in real time and queues the request for the EOS. Referring to FIG. 9, the event owner server periodically polls the ARS on a predetermined schedule to see if any inventory requests are pending at block 140. If no new requests are determined at block 142, the event owner takes no action, block 144. If a request is pending as at block 146, the event owner process the request at block 148. Returning to FIG. 2, upon determining and approving availability, the EOS at block 132 confirms the request to the ASR and updates the available remote inventory. Thereafter, in response to confirmation, the ASR issues notification to the consumer and provides a confirmation number at block 134.

The local event server maintains the inventory through an application that is specific to the inventory type. Such goods and services programs are well known and used by the involved commercial activity. Such programs include definition and description of the inventory as well as the means to sell the inventory locally. Such capability allows the event owner to sell local inventory contemporaneously and gives the local event owner priority in the event of a reservation conflict. To the extent such local sale invades the remote allocation, the EOS issues an appropriate revision to the ASR.

Having the necessary data available on the active reservation server allows any type of reservation system that is needed to be constructed. Any number of Internet-based reservation systems can be tied into the active reservation server and any of these systems can be modified at any time to meet the needs of the individual event vender. These changes are available the next time the Internet-based reservation system is used. These Internet-based reservation systems are used by not only travel agents and booking agents, but also anyone with access to the Internet.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method for operating an Internet based active reservation system for the purchase of goods and services, comprising:

(a) providing an owner event server located at and operated by a local event owner having an available inventory of goods and services at a local site;

(b) providing an active reservation server located at and operated by user remote from said local site, said active reservation server accepting only data from said owner event server and formatting said data for viewing by an Internet-based consumer;

(c) allocating said available inventory by only said owner event server at all times between local inventory and Internet inventory;

(d) adjusting said available inventory by only said event owner at said owner event server at all times based on purchases of goods and services at said local event site;

(e) communicating said allocated Internet inventory only to said active reservation server;

(f) receiving purchase requests for goods and services in said Internet inventory at said active reservation server from said Internet-based consumer;

(g) communicating said purchase requests from said active reservation server to said owner event server;

(h) accepting said purchase requests solely at said local event server and adjusting said Internet inventory only by said owner event server at all times to establish an adjusted Internet inventory;

(i) communicating said accepting and said adjusted Internet inventory from said owner event server to said active reservation server; and (j) communicating said accepting and confirmation indicia relative thereto from said active reservation system to said Internet consumer.

2. A method for operating a system for locally and remotely reserving the purchase of goods and services, comprising: establishing an local event server located at a local site: establishing a reservation server at a remote site; communicating said local event server with said reservation server through a first Internet connection; maintaining on said local server an inventory of available goods and services; designating a rate structure for each of said goods and services; allocating a portion of said inventory at all times only at said local event server as reservation server inventory including said rate structure; communicating said reservation server inventory at all times only by said local event server to said reservation server; making available to consumers through secondary Internet connections said reservation server inventory in a reservation server selected format; receiving from consumers through said secondary Internet connection prospective reservations from said consumers for discrete items in said reservation server inventory and consumer identification indicia for such consumers; communicating said prospective reservations from said reservation server to said local server; accepting said prospective reservations only at said local server at all times for said discrete items and removing said discrete items from said reservation inventory only at said local server at all times to establish an adjusted reservation server inventory; creating confirmation accepting indicia of said accepting at said local server; communicating said adjusted reservation server inventory and said confirmation accepting indicia from said local server to said reservation server; communicating said confirmation accepting indicia from said reservation server to said consumers; and making available to consumers through said secondary Internet connections said adjusted reservation server inventory in a reservation server selected format.

3. A method for system for the reserving goods and services at a local site, comprising:

providing a first server located at said local site and establishing thereon an available inventory of goods and services available at a local site;

providing an active reservation server located at a remote site not connected with said local site, said active reservation server only accepting data at all times from said owner event server and only formatting said data for viewing by an Internet-based consumer;

designating on said local server a compilation of available inventory allocated only at said at said local server at all times between local inventory and Internet inventory;

accepting reservations for the goods and services only at said local site at all times and adjusting said available inventory at said local server in accordance with said adjusting based on purchases of goods and services at said local event site and adjusting said Internet inventory as required to establish a current Internet inventory;

communicating said current Internet inventory as data to said reservation server;

displaying said current Internet inventory at said reservation server in a reservation server selected format on a web site for viewing by prospective consumers;

receiving purchase requests at said reservation server for goods and services as displayed in said selected format on said web site from consumers for items available in said current Internet;

communicating said purchase requests from said reservation server to said local server;

accepting said purchase requests only at said local server at all times;

adjusting said current Internet inventory to establish an adjusted Internet inventory accounting for the accepting of said purchase requests;

communicating said accepting and said adjusted Internet inventory from said local server to said reservation server; and (j) communicating said reservation server to said consumer through an Internet connection.

4. A locally maintained reservation system for the local and remote reservation of available items, said reservation system comprising: local server means including inventory control means for compiling available items for reservation; means operatively associated with said local server means allocating only at said local server means at all times at least a portion of said available items for remote reservation through an Internet-based web site on reservation serving means; means for communicating to said reservation server means an itemization of said portion of available items and rates and conditions attendant thereto; means associated with said local server means for receiving from said reservation serving means prospective reservations for discrete items in said portion of available items; means associated with said local server means for accepting said prospective reservations only at said local server means at all times and adjusting said portion of available items only at said local server means at all times in accordance therewith to establish a revised portion; and means associated only with said local server means at all times for communicating to said reservation server means said revised portion and supplanting the prior portion whereby reservations and said local site and remote site can be simultaneously processed without redundancy.

* * * * *